Jan. 22, 1952    J. S. ECKERT    2,583,330
APPARATUS FOR GIVING AN INTERNAL GLOSS FINISH TO
A TUBE OR THE LIKE OF HEAT PLASTIC MATERIAL
Filed Dec. 2, 1948

INVENTOR.
JOHN S. ECKERT
BY Willard D. Eakin
ATTORNEYS

Patented Jan. 22, 1952

2,583,330

UNITED STATES PATENT OFFICE 2,583,330

APPARATUS FOR GIVING AN INTERNAL GLOSS FINISH TO A TUBE OR THE LIKE OF HEAT PLASTIC MATERIAL

John S. Eckert, Kent, Ohio, assignor to The United States Stoneware Company, Akron, Ohio, a corporation of Ohio Application December 2, 1948, Serial No. 62,988

7 Claims. (Cl. 18—14)

1

This invention relates to apparatus for forming tubing or the like from a plastic stock, such as a vinyl resin, as by extrusion, and giving the surface of the product a smooth gloss finish, as in giving such a finish to the inner surface of a tube, to make it sanitary and easy to clean, for the handling of liquid food products, for example, and to give the tube better transparency than it would have without such a finish.

The present invention is an improvement based upon that of my copending application Ser. No. 25,958, filed May 8, 1948, and the chief objects are to provide for imparting an improved finish to the inner face of the tube; to provide for imparting the finish to the inner face of the tube without overheating of the die by the induction that heats said inner face; to provide for heating either or both of the inner and outer faces of the tube, for imparting the finish, without contact of apparatus with the tube at the position where the finish is progressively given to it; and to provide for desirable control of the temperatures of the shaping die and the shaping mandrel and of the inner and outer faces of the tube at the heat-finishing positions.

Figure 1:
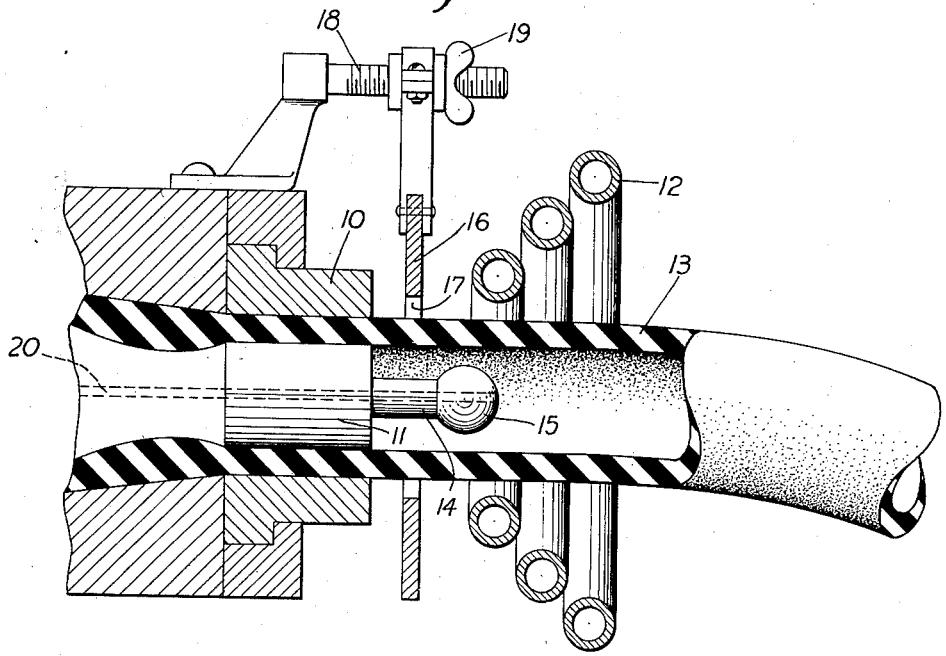
Fig. 1 is a fragmentary vertical section of apparatus embodying and adapted for the practice of my invention in its preferred form.
Figure 2:
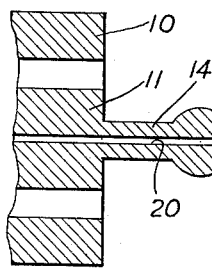
Fig. 2 is a fragmentary vertical section of parts of the same on a larger scale.

The apparatus shown in Fig. 1 comprises an extruding machine of which the die is shown at 10 and the mandrel at 11.

The primary coil 12 of a high-frequency induction heater, which can be of standard construction, surrounds, without contacting, the extruded tube 13 at a distance from the delivery ends of the die 10 and mandrel 11.

The main body of the mandrel is formed with a neck 14 extending centrally into the tube and terminating in a metal head 15 of larger diameter than the neck but of less diameter than the interior of the tube, so that the inner face of the tube does not contact the neck or the head of the mandrel extension as it passes them in the extruding operation.

The head 15 is in position to be heated by the induction coil 12 and I find that without contacting the inner face of the tube, but heating it only by radiation, it imparts a superior gloss finish to it.

2

The relative small-diameter size and the length of the neck 14 are such that the mandrel body 11 does not become overheated by conduction of heat from the head through the neck.

To avoid excessive induction heating of the die 10 by the coil 12, a preferably circular shield 16 is interposed between them, the shield having a central hole 17 of larger diameter than the outer diameter of the tube 13, so that the tube passes through the shield without touching it.

Preferably the shield is suspended from adjustable means such as the threaded bracket 18 and swivel nut 19, so that it can be set at different positions between the die 10 and the coil 12 to provide controllable temperatures of the shield and to vary the degree of supplemental heating of the die 10.

I find that with a suitable temperature in the shield it so heats the outer face of the tube 13 by radiation, without touching it, as to impart a superior gloss finish to it.

The mandrel body 11 and its extension 14, 15 preferably are formed with an axial passage 20 for passing a cooling fluid through them and through the tube as it is being shaped, for control of temperatures, or for blowing an adhesion preventing or finish-modifying powdered substance such as talcum into contact with the inner face of the tube.

Means such as the usual conveyor and cooling bath, not shown, can be provided for continuously withdrawing the finished tube from the apparatus shown and progressively cooling it.

Figure 3:
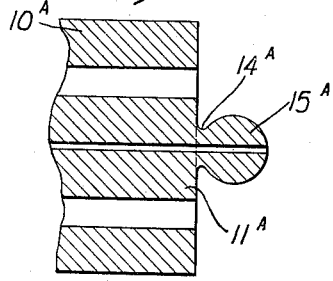
Fig. 3 is a similar section of a modification.

The embodiment shown in Fig. 3 corresponds to that just described except that the neck 14a is relatively short, for conduction of more heat from the head, 15a, to the mandrel body, 11a.

Figure 4:
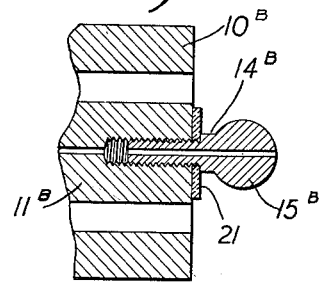
Fig. 4 is a similar section of another modification.

Fig. 4 shows a modification in which the mandrel body, 11b, is formed with a threaded countersink in the center of its delivery end face, the neck 14b of the mandrel extension is threaded and screwed into the countersink, and a heat-insulating washer 21 is mounted between the end face of the mandrel and an annular shoulder formed on the neck portion of the mandrel extension. This insulation lessens radiation of heat from the head, 15b, to the mandrel and also lessens to some extent conduction of heat to the mandrel. The particular form of insulation, if used, if of course subject to modification as desired.

The appended claims are to be understood as not being wholly limited to the specific embodiment of the invention that is here shown.

I claim:
1. Tube-extruding and finishing apparatus comprising an extrusion die and mandrel, a heating element, means of low heat-conductivity projecting from the delivery end of the mandrel for holding said element in but not in contact with the tube as the tube passes from the die, and induction-heating means surrounding the path of the tube at approximately the position of said element.

2. Tube-extruding and finishing apparatus comprising an extrusion die and mandrel, a heating element, means of low heat-conductivity projecting from the delivery end of the mandrel for holding said element in but not in contact with the tube as the tube passes from the die, and means for maintaining said element at a temperature such as to modify the texture of the inner face of the tube by radiating heat thereto, the device including heat-insulating means between the effective portion of said element and the mandrel.

3. Tube-extruding and finishing apparatus comprising an extrusion die and mandrel, a heating element, means of low heat-conductivity projecting from the delivery end of the mandrel for holding said element in but not in contact with the tube as the tube passes from the die, and means for maintaining said element at a temperature such as to modify the texture of the inner face of the tube by radiating heat thereto, said supporting means comprising a neck projecting from the mandrel.

4. Apparatus for continuously forming and imparting a surface finish to a strip of material, said apparatus comprising an extrusion die, an induction-heater primary coil surrounding the path of the strip at a distance from the die, means for shielding the die from the heating effects of the said coil, and means for holding the shielding means at a position between the two.

5. Apparatus for continuously forming and imparting a surface finish to a strip of material, said apparatus comprising an extrusion die, an induction-heater primary coil surrounding the path of the strip at a distance from the die, means for shielding the die from the heating effects of the said coil, and means for holding the shielding means at a position between the two, the shielding means being a metal annulus surrounding the path of the strip.

6. Apparatus for imparting a surface finish to a strip of material, said apparatus comprising means for feeding the strip past a finish-imparting position, an induction-heater primary coil surrounding the path of the strip at said position, heat-radiating means adapted to be heated by said coil, and means for holding said radiating means out of contact with the strip but in position to be heated by the coil and to radiate heat to the strip.

7. Apparatus for imparting a surface finish to a strip of material, said apparatus comprising means for feeding the strip past a finish-imparting position, a heat-radiating annulus, means of low heat conductivity for holding said annulus at said position and surrounding the path of the strip, and means for maintaining said annulus at a substantially uniform temperature throughout such as to fuse slightly a surface film only of the strip and thus to impart a gloss finish to the strip.

JOHN S. ECKERT.

REFERENCES CITED

The following references are of record in the file of this patent:

UNITED STATES PATENTS

| Number | Name | Date |
| --- | --- | --- |
| 1,925,545 | Royle | Sept. 5, 1933 |
| 2,023,665 | Clayton | Dec. 10, 1935 |
| 2,375,827 | Slaughter | May 15, 1945 |
| 2,433,937 | Tornberg | Jan. 6, 1948 |
| 2,452,080 | Stephenson | Oct. 26, 1948 |

FOREIGN PATENTS

| Number | Country | Date |
| --- | --- | --- |
| 173,082 | Germany | July 16, 1906 |
| 89,112 | Sweden | Feb. 25, 1937 |